United States Patent

Holland

[11] Patent Number: 5,364,821
[45] Date of Patent: Nov. 15, 1994

[54] PRODUCING ACTIVE CARBON USING MICROWAVE DISCHARGE

[76] Inventor: Kenneth M. Holland, Ashwood, Wynwoods, Campbell Close Rise Park, Romford, Essex, United Kingdom

[21] Appl. No.: 861,886

[22] PCT Filed: Oct. 17, 1990

[86] PCT No.: PCT/GB90/01606
§ 371 Date: Jun. 18, 1992
§ 102(e) Date: Jun. 18, 1992

[87] PCT Pub. No.: WO91/05735
PCT Pub. Date: May 2, 1991

[30] Foreign Application Priority Data

Oct. 17, 1989 [GB] United Kingdom ............... 8923361

[51] Int. Cl.⁵ .................. B01J 37/34; B01J 20/20; C01B 31/10
[52] U.S. Cl. ........................ 502/5; 201/19; 502/416; 502/437; 502/522
[58] Field of Search .............. 502/5, 437, 522, 416; 423/449.7, 460, 461; 201/19, 2.5

[56] References Cited

U.S. PATENT DOCUMENTS

| | | | |
|---|---|---|---|
| 3,822,218 | 7/1974 | Whittaker et al. | 502/437 |
| 3,823,221 | 7/1974 | Wakefield et al. | 423/449.7 |
| 3,823,224 | 7/1974 | Lamay et al. | 423/449.7 |
| 3,843,457 | 10/1974 | Grannen et al. | 201/19 |
| 3,875,077 | 4/1975 | Sanga | 502/437 |
| 4,118,282 | 10/1978 | Wallace | 201/2.5 |
| 4,647,443 | 3/1987 | Apfel | 423/449 |

FOREIGN PATENT DOCUMENTS

| | | |
|---|---|---|
| 50-085685 | 7/1975 | Japan. |
| 51-037890 | 3/1976 | Japan. |
| 51-042096 | 4/1976 | Japan. |
| 51-047193 | 12/1976 | Japan. |
| WO88/08871 | 11/1988 | WIPO ............... 502/5 |

OTHER PUBLICATIONS

Chem. Abs., vol. 86 No. 10, p. 75 56668s, 7 Mar. 1977.

*Primary Examiner*—Paul E. Konopka
*Attorney, Agent, or Firm*—Rodman & Rodman

[57] ABSTRACT

A method of producing active carbon by microwave-induced pyrolysis of a carbonaceous material in an atmosphere wherein flame generation is prevented. The resulting product is treated with an acid to wash out sulphur or metal values and then activated with superheated steam and/or carbon dioxide at an elevated temperature.

9 Claims, 5 Drawing Sheets

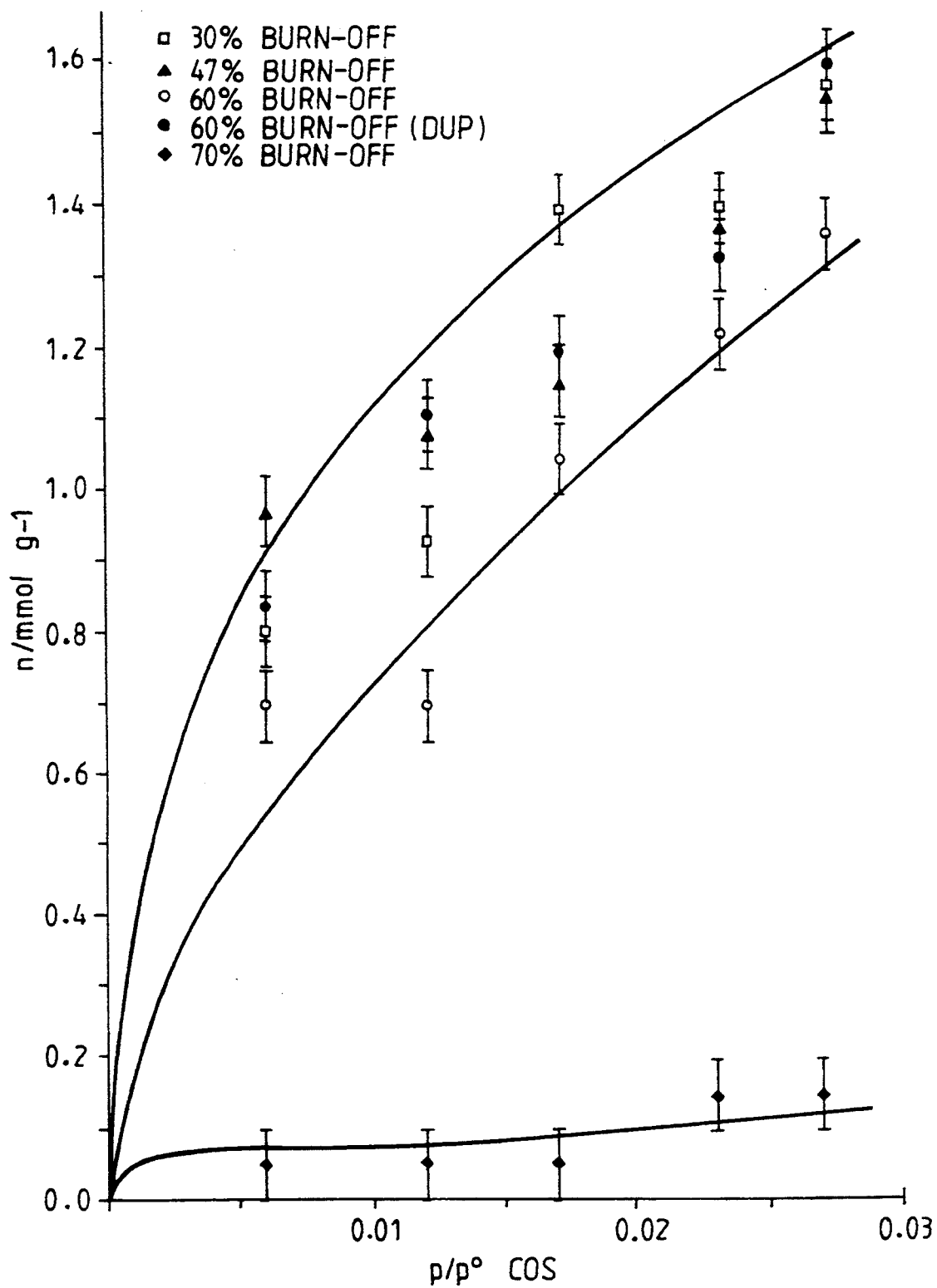

PRODUCING ACTIVE CARBON USING MICROWAVE DISCHARGE

The present invention is concerned with active (or "activated") carbon, and the production thereof.

Active carbon is an amorphous form of carbon characterised by high internal porosity, and consequently high adsorptivity either for gases and vapours, or for liquids. Active carbon is typically obtained by the pyrolysis of wood, nut shells, animal bones or other carbonaceous material, and "activation" by heating to 800–900 degrees Celsius using steam or carbon dioxide.

According to the present invention, there is provided a method of production of active carbon, which comprises pyrolysing a carbonaceous material by subjecting said material to a microwave discharge (such that the material attains a temperature of at left 800 degrees Celsius), in an atmosphere which is such that flame generation is substantially prevented, acid washing if the pyrolysed product contains substantial quantities of sulphur or metal values, and activating the resultant product by treating at an elevated temperature with superheated steam and/or carbon dioxide. The elevated temperature achieved during activation is preferably at least 800 degrees Celsius.

The carbonaceous starting material preferably contains carbon black. Preferred materials include carbon-filled rubber, such as waste tire compound. Following pyrolysis, the latter will generally contain substantial quantities of sulphur and metal values, and is therefore subjected to acid washing prior to the activation with superheated steam and/or carbon dioxide.

Other possible carbonaceous materials include sewage, waste vegetable matter or the like. When the carbonaceous material to be pyrolysed is susceptible to microwaves, then the pyrolysis is preferably as described in my PCT specification WO89/04355; when the material is not susceptible to microwaves, then the pyrolysis is preferably as described in my PCT specification WO88/08871. The whole contents of these two prior specifications are hereby incorporated by reference.

The product of the pyrolysis stage is preferably raised to the elevated temperature used during activation by microwave treatment.

The micro-porosity of active carbon derived from such carbonaceous material depends on the percentage weight loss of the pyrolysed material during the activation stage. The active carbon has maximum microporosity after a reduction in weight of at least 30% and less than 70% (such as 30 to 60%). When the weight loss is 70% or more, the majority of the carbon material is removed and the measured porosity is significantly impaired.

Similarly, the surface area of the active carbon increases to a maximum value when 30–60% weight loss has occurred.

When it is desired to wash to remove metal values and/or sulphur, a suitable acid is hydrochloric acid; acid washing is preferably followed by neutralisation (for example, with caustic soda or the like) and washing with water or other aqueous liquid to remove the resulting neutral salts.

The resulting active carbon, which is typically used for filtration of liquids, generally has a holding power equal to at least 15% by weight of the active carbon. The present invention therefore further comprises a filter for liquid filtration which comprises a receptacle having therein a body of active carbon produced by the method according to the invention.

Preferred features of the present invention will be further illustrated in the following Example, in which reference is made to FIGS. 1 to 5 of the accompanying drawings, wherein.

Figure 3:
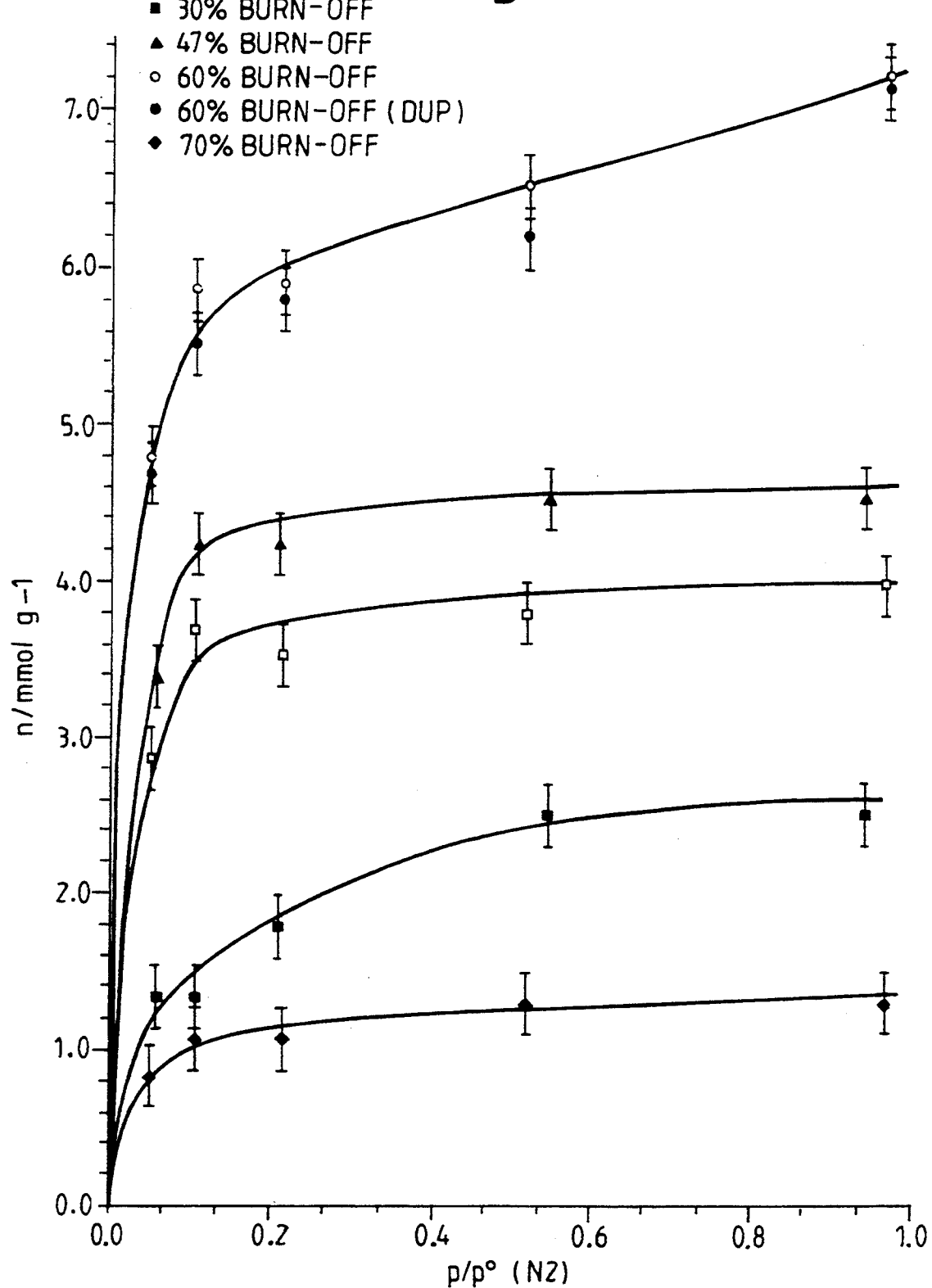
Figure 4:
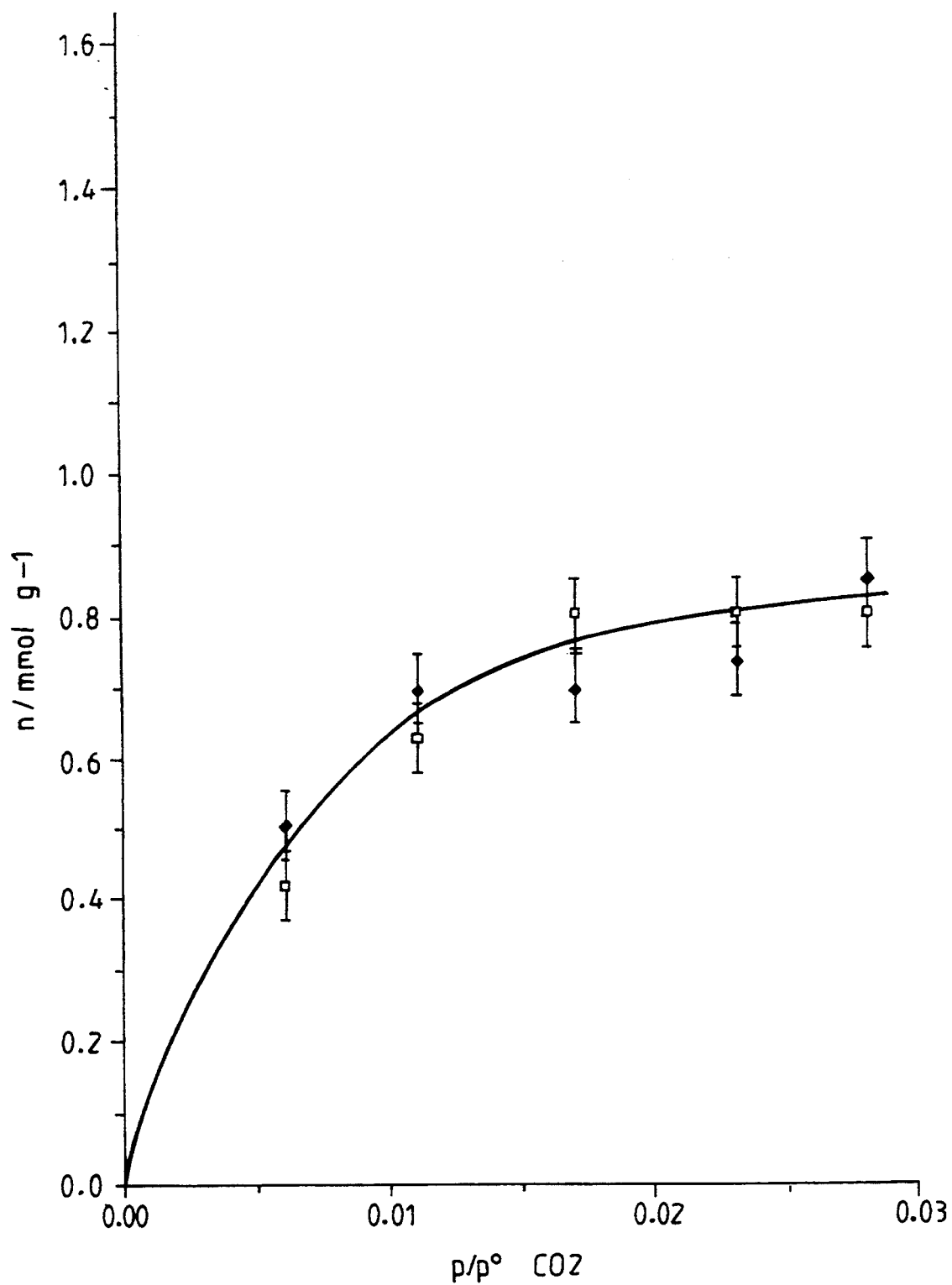

FIG. 3 shows a series of Langmuir Adsorption Isotherms for nitrogen, each isotherm resulting from a sample of active carbon produced according to the invention, having a percentage weight loss (burn off) in the range of 20 to 70%; and FIG. 4 shows a carbon dioxide isotherm for microwave pyrolysed tire compound; and FIG. 5 shows carbon dioxide isotherms for active carbons produced therefrom, with a range of percentage weight losses (burn off) in the range 30 to 70%.

EXAMPLE

Waste tire material was pyrolysed as described in my PCT application WO89/04355. The material was then cooled, screened to a particle size of less than 100 microns and washed with hydrochloric acid such that the resulting carbon content was in excess of 90%.

Figure 1:
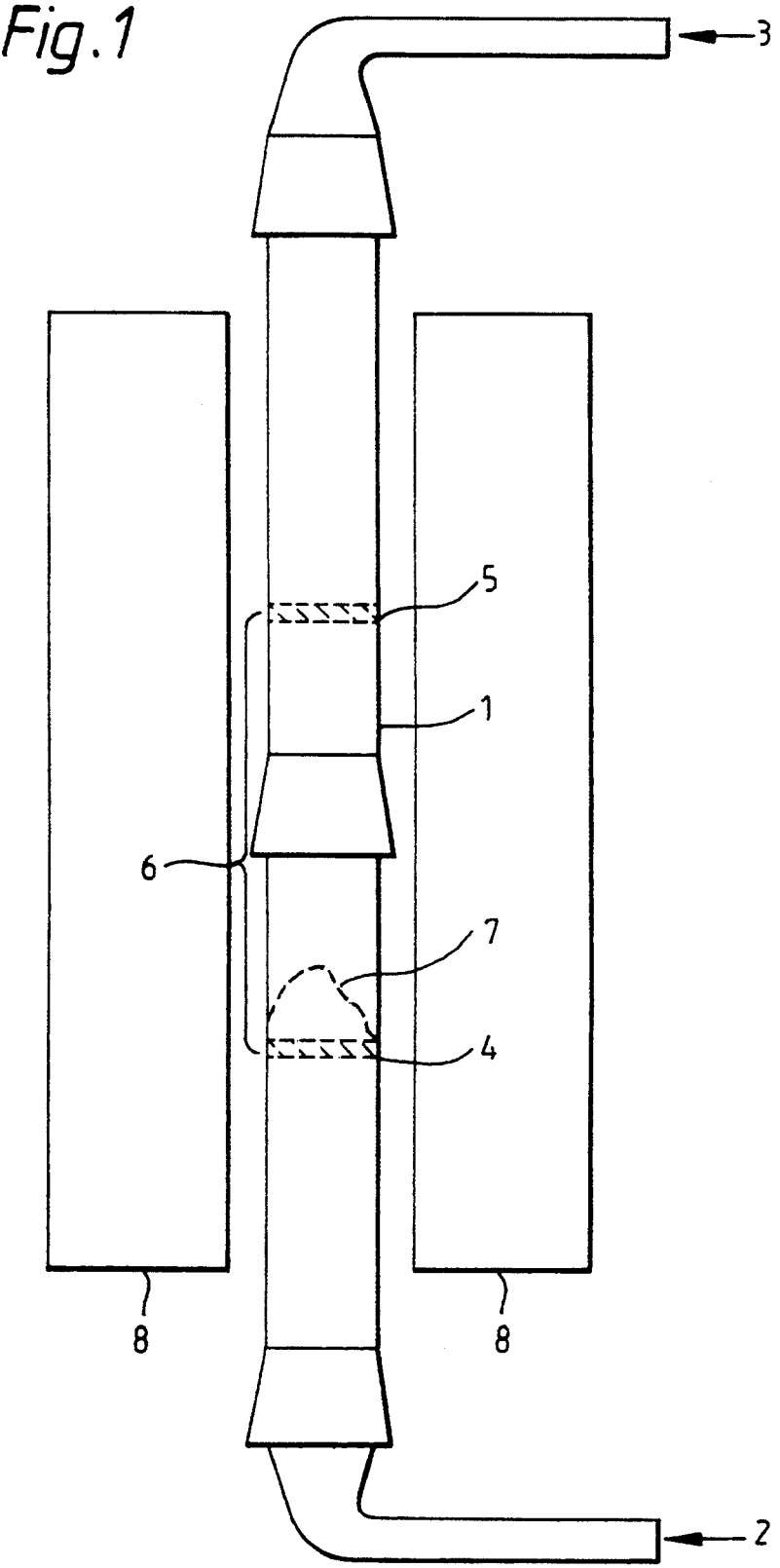
FIG. 1 is a schematic representation of apparatus employed for activation of carbon in the method according to the invention.
Figure 2:
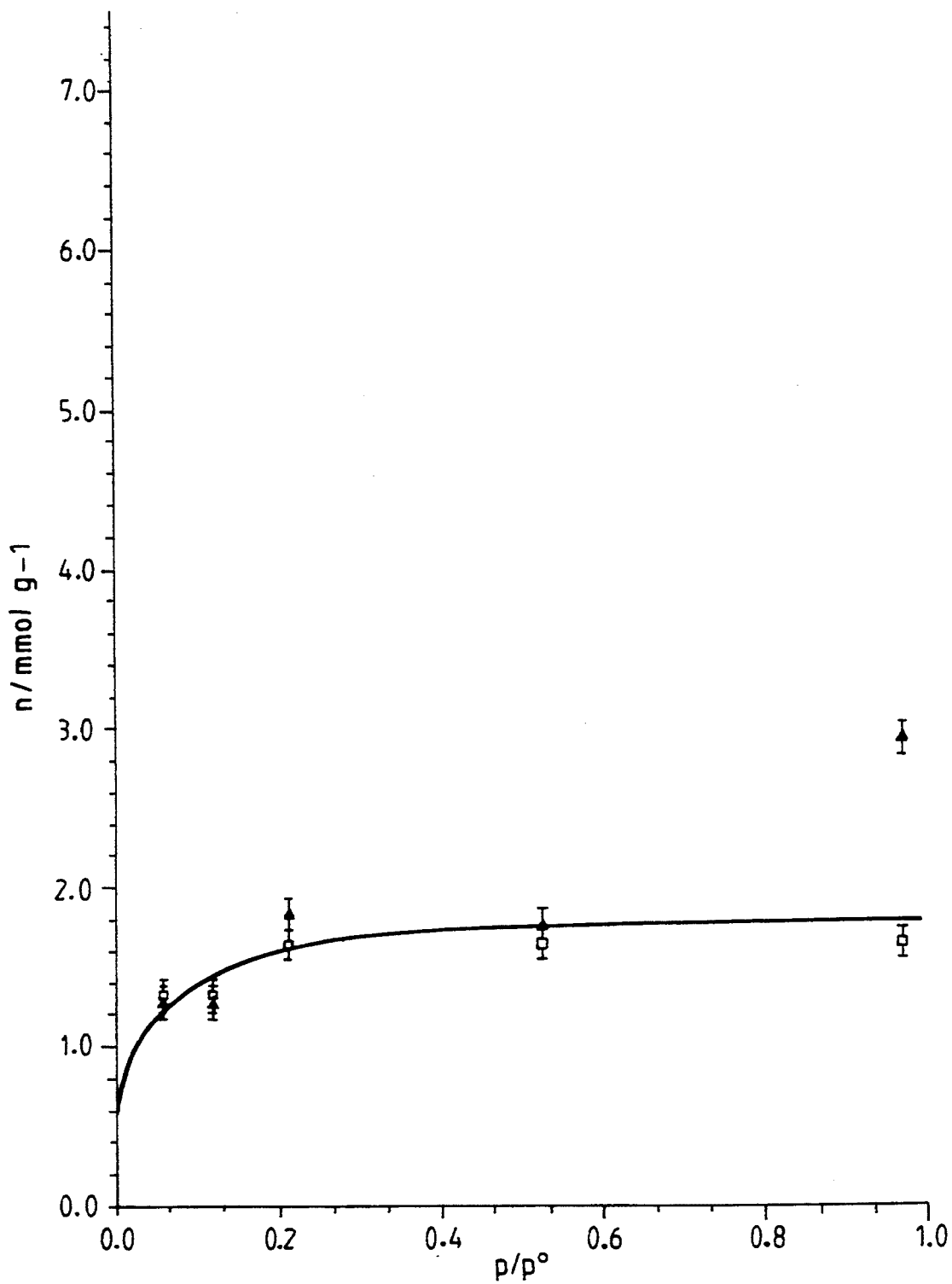
FIG. 2 shows a Langmuir Adsorption Isotherm for nitrogen measured at 77 degrees Celsius, of microwave pyrolysed tire compound.

The resulting particulate material was activated in a silica tubular reaction zone as schematically illustrated in FIG. 1. The reaction zone comprises a tube 1 with a gas inlet 2, through which carbon dioxide or nitrogen is supplied and an outlet 3 from which spent gas is exhausted.

The tube has a pair of porous silica discs 4, 5 filling the tube and defining therebetween a reaction zone 6 in which is disposed the pyrolysed material 7 to be activated. The reaction zone is surrounded by a furnace 8, which may be a conventional thermal furnace or, preferably a microwave discharge furnace. The properties of the resultant material are summarised as follows.

Nitrogen was used at 77 degrees Celsius to obtain the surface area measurement in the following table in the BET analysis column, and carbon dioxide at 273 degrees Celsius in the D-R analysis column. The table shows the measured surface areas ($m^2.g^{-1}$) of the active carbon obtained from waste tire compound at certain stages of the weight loss process.

| Activation | BET ANALYSIS | D-R ANALYSIS |
| --- | --- | --- |
| As-received | 75 | 171 |
| 20% Weight loss | 108 | — |
| 30% Weight loss | 167 | 353 |
| 47% Weight loss | 185 | 270 |
| 60% Weight loss | 272 | 303 |
| 60% Weight loss (dup) | 287 | 292 |
| 70% weight loss | 58 | 29 |

Various degrees of weight loss (burn off) were obtained; the properties of the resulting active carbon at different partial pressures are shown graphically in FIGS. 2 to 5 of the accompanying drawings. These show that optimum properties are achieved with weight loss in the range 30 to 60%.

I claim:

1. A method of production of active carbon, consisting essentially of:
   (i) subjecting a carbonaceous material to a first microwave discharge to pyrolyze said material, in an atmosphere wherein flame generation is substantially prevented;
   (ii) selectively acid washing said pyrolyzed material to substantially remove sulfur or metal values therefrom;
   (iii) subjecting said acid-washed pyrolyzed material to a second microwave discharge to raise the temperature of said acid-washed pyrolyzed material to an elevated temperature sufficient for subsequent activation of said acid-washed pyrolyzed material; and
   (iv) treating said acid-washed pyrolyzed material with superheated steam and/or carbon dioxide at said elevated temperature to cause activation of said pyrolyzed material.

2. The method of claim 1, wherein said atmosphere contains not more than 5% by volume of oxygen.

3. The method of claim 1, wherein said acid washed material is neutralized with a base and then washed with an aqueous liquid prior to step (iii).

4. The method of claim 1, wherein said carbonaceous material contains carbon black.

5. The method of claim 4, wherein said carbonaceous material comprises waste tires.

6. The method of claim 1, wherein step (iii) is controlled so as to cause 30 to 60% weight loss of said pyrolyzed material.

7. The method of claim 1, wherein after step (i), the particle size of pyrolyzed carbonaceous material is reduced to less than about 100 microns.

8. A method of production of active carbon, consisting essentially of:
   (a) subjecting waste tire material to a first microwave discharge to pyrolyze said material in an atmosphere wherein flame generation is substantially prevented;
   (b) selectively acid washing said pyrolyzed material to substantially remove sulfur or metal values therefrom; followed by
   (c) neutralizing said acid-washed material with a base, followed by washing the neutralized material with an aqueous liquid; and
   (d) subjecting said neutralized pyrolyzed material to a second microwave discharge to raise the temperature of said neutralized pyrolyzed material to an elevated temperature sufficient for subsequent activation of said neutralized pyrolyzed material; and
   (e) treating said neutralized pyrolyzed material at said elevated temperature with superheated steam and/or carbon dioxide to activate said pyrolyzed material, wherein said activation treatment is controlled to produce a weight loss of about 30–60% of said pyrolyzed material.

9. The method of claim 8, wherein after step a, the particle size of pyrolyzed carbonaceous material is reduced to less than about 100 microns.

* * * * *